Jan. 7, 1930.                F. E. WYMAN                1,742,744
                              TRANSMISSION
                           Filed July 2, 1928
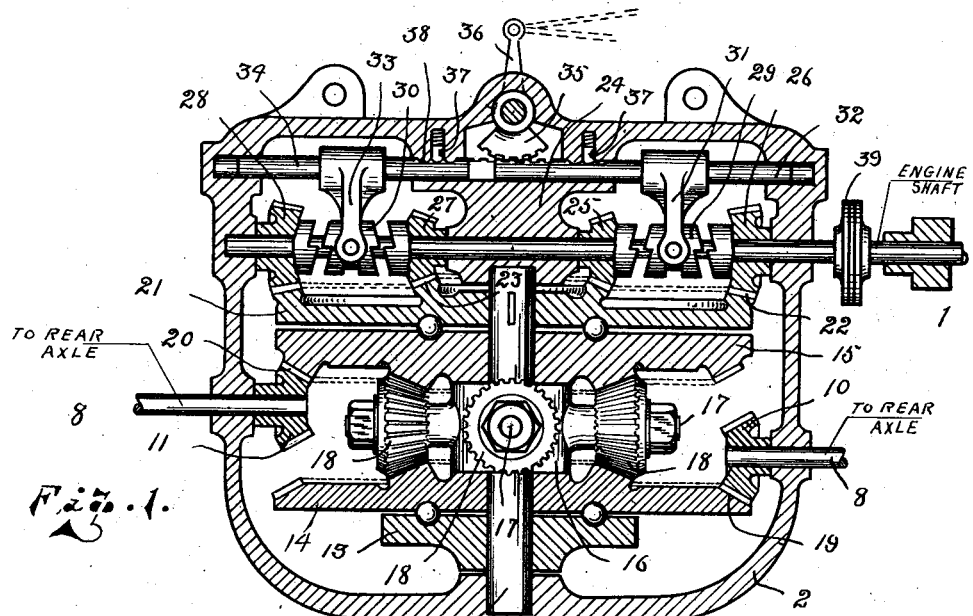
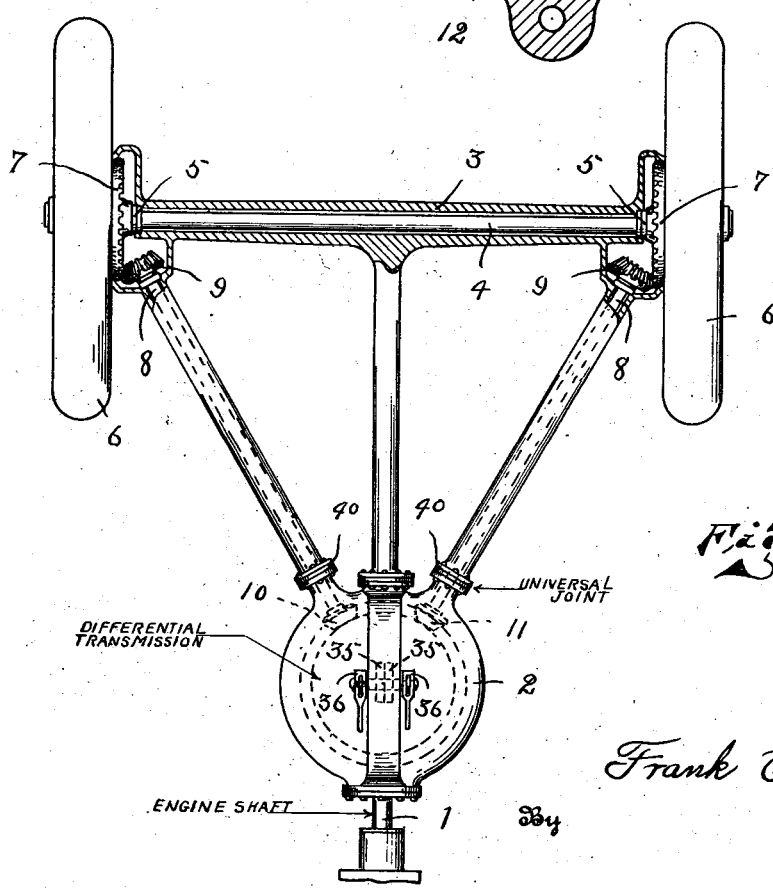
Inventor
Frank E. Wyman.
By
Geo Stevens
Attorney Patented Jan. 7, 1930

1,742,744

UNITED STATES PATENT OFFICE

FRANK E. WYMAN, OF FAUNCE, MINNESOTA

TRANSMISSION

Application filed July 2, 1928. Serial No. 289,768.

This invention relates to power transmission devices and has special reference to such a device for adaptation to an automobile.

The principle object of the invention is to centralize as much as possible the entire transmission mechanism and differential of the ordinary automobile.

Another object is to dispense with the objectionable features of the installation of the differential on the rear axle of the automobile.

Other objects and advantages of the invention will appear in the further description thereof.

Referring now to the accompanying drawing, forming part of this application, and wherein like reference characters indicate like parts:

Figure 1 is a vertical section through the improved combination differential and transmission; and Figure 2 is a plan view of the rear assembly of an automobile equipped with the device as shown in Figure 1.

1 represents the engine shaft as found on the ordinary automobile, it extending rearwardly from the engine not shown.

Adjacent the engine and attached to the chassis of the automobile in any desired manner is installed the housing 2 which contains the improved transmission and differential.

3 represents the rear axle housing of the automobile which may have an axle 4 extending completely therethrough for strength and also upon the ends of which are mounted suitable skeins or wheel supports 5 upon which the hubs of the rear wheels 6 are rotatably mounted and provided with the usual ball or roller bearings, the wheels being independently rotatable and the axle 4 stationary. Leading from each wheel 6, the hubs of which are provided with beveled gears indicated at 7, is a diagonally disposed driving shaft 8, carrying upon the rearmost end the beveled gear 9 which meshes with its respective wheel gear 7, and the opposite ends of the shafts 8 lead to and into the transmission housing 2 where they are each provided with a beveled gear, one shown at 10 and the other at 11.

The entrances of these shafts to the housing 2 converge from the rear forming an acute angle therebetween, as clearly shown in Figure 2, though for convenience in illustration I have shown them upon opposite sides in Figure 1. Centrally of the housing 2 is rotatably mounted the shaft 12 about the lower end of which is a supporting disc 13 carrying suitable ball bearings for the non-frictional support of the disc gear 14 which is loose about the shaft 12 and also the disc gear 15 which is likewise loose about the shaft; these two gears being spaced from each other and having mounted therebetween the hub 16 which is keyed to the shaft 12 and upon which are mounted the radial arms 17, each carrying a beveled pinion 18. These pinions are in constant mesh with the two loose gear discs 14 and 15 forming the ordinary differential mechanism.

The gear 10 upon one of the shafts 8 meshes with the upper geared face as at 19 with the disc gear 14, while the gear 11 on the opposite shaft 8 is meshed as at 20 with the lower geared face of the disc 15, so that as these discs rotate in like direction they rotate the shafts 8 in opposite directions, thus transmitting power in like direction to the rear wheels of the automobile. Any differential that may be demanded at the wheels will be automatically cared for intermediate of the disc gears 14 and 15 in the usual manner customary in such differentials.

Above the disc gear 15 is mounted the driving gear 21, it having two cogged faces, one at 22 and the other at 23, so arranged for the different speeds necessary in the transmission of power, and as is obvious for the forward motion of the car there may be a greater number of cogged surfaces, for example, one or two more with suitable mechanism for engaging and disengaging same, thus providing additional forward speeds. A ball bearing is shown intermediate of the gears 15 and 16 for obvious reasons and the upper end of the shaft 12 may have a bearing in the hub like depending portion 24 of the cover of the housing 2.

The engine shaft 1 extends transverse the top and into the housing 2, it having a bearing upon either side thereof as well as in the depending portion 24, and carries upon either side of said portions a pair of spaced beveled gears indicated at 25 and 26 upon one side of the housing, and at 27 and 28 upon the other side of the housing; the latter being the reverse transmission mechanism, while the former is the forward transmission means.

The opposed faces of each pair of said gears are provided with clutch faces for engagement with the slidable clutch member 29 on one side and 30 upon the other side of the housing, these clutch members being splined to the shaft 1 and carry with them whatever gear is thrown into engagement therewith. To perform the throwing action of the clutch members, the one 29 is operated by the fork 31 depending from the slidable rectangular shaft 32, while the clutch member 30 is operated by the fork 33 depending from a similar slidable shaft 34. The inner ends of these shafts overlap each other and are provided with cogged racks into each of which a cogged quadrant 35 meshes and each controlled by a lever 36 in any desired manner from the control levers of the car.

By this arrangement it is apparent that if the lever 36 operating the quadrant 35 moves the clutch 29 to the right as viewed in Figure 1 it will engage the gear 26 which will set the gear wheel 21 in motion, and it being keyed to the upper end of the shaft 12 will rotate bodily the transmission mechanism in a clockwise direction as viewed from the bottom thereof, thus rotating the shafts 8 in the opposite direction and propelling the car through the differential mechanism previously described. Whereas, when the lever 36 is thrown in the opposite direction so as to engage the gear 25 the same action will take place, though at a reduced speed, the inner cogged surface 23 being less in diameter than that indicated at 22.

When desired to operate the car in the opposite direction, the other lever 36 which operates the other quadrant 35 and slides back and forth the shaft 35 will cause the clutch 30 to function in like manner as just described in respect to the clutch 29 but in the opposite direction, as is obvious.

Attention is directed to the spring controlled plugs 37 above each shaft 32 and 34, they operating in slight depressions indicated at 38 in each shaft so that the clutches are automatically biased in active position in either direction, or in inactive position, there being such a plug for each of the slidable members.

I have shown a universal coupling as at 39 on the engine shaft but such may not be necessary and forms no part of the invention, and such couplings are also illustrated at 40 in respect to the divergent rearmost drive shafts 8, which may or may not be necessary. The casings for such shafts may be braced in any desired manner to be made sturdy and serviceable.

From the foregoing it is evident that I have devised means whereby the differential mechanism of an automobile may be assembled in close juxtaposition with the engine and thus centralize the major portion of the driving mechanism of the car, and provide a more substantial rear end assembly, especially adapted for heavy duty service for trucks or the like.

Having thus described my invention, what I claim and desire to secure by Letters Patent, is:

A combined transmission and differential within a single housing characterized by having a power transmission shaft horizontally disposed in the upper portion of the housing, selective gears carried by said shaft, means for intermittently selecting different sets of gears for power transmission purposes or permitting them to idle, a vertically disposed counter shaft centrally of the housing and beneath the power transmitting shaft, a disc gear fixed to said countershaft and in constant mesh with all of the selective gears, spaced disc gears beneath the first mentioned disc loosely mounted upon the countershaft, radially disposed gears fixed to said countershaft and in constant mesh with the spaced disc gears, and driven shafts extending through the housing each carrying a separate gear in constant mesh with a separate one of the spaced gears.

In testimony whereof I affix my signature.

FRANK E. WYMAN.